United States Patent [19]
Curchod

[11] Patent Number: 5,328,230
[45] Date of Patent: Jul. 12, 1994

[54] CAR COVER AND ANCHORING ASSEMBLY

[76] Inventor: Donald B. Curchod, 345 Eleanor Dr., Woodside, Calif. 94062

[21] Appl. No.: 22,046

[22] Filed: Feb. 24, 1993

Related U.S. Application Data

[63] Continuation-in-part of Ser. No. 766,327, Sep. 26, 1991, Pat. No. 5,188,417.

[51] Int. Cl.⁵ .............................................. B60J 7/20
[52] U.S. Cl. ................................. 296/136; 296/37.1; 296/76
[58] Field of Search .................. 296/136, 37.16, 37.1, 296/76; 150/166

[56] References Cited

U.S. PATENT DOCUMENTS

| | | | |
|---|---|---|---|
| 4,560,245 | 12/1985 | Sarver | 296/95 |
| 4,856,842 | 8/1989 | Ross et al. | 296/136 |
| 4,863,210 | 9/1989 | Kenon | 296/136 |
| 4,867,216 | 9/1989 | McKee | 150/166 |
| 4,903,749 | 2/1990 | Hanania | 160/370.2 |
| 4,940,276 | 7/1990 | Madison | 296/136 |
| 4,948,191 | 8/1990 | Cao | 296/95.1 |
| 4,958,881 | 9/1990 | Piros | 296/98 |

FOREIGN PATENT DOCUMENTS 54-23706  8/1979  Japan ................................. 296/136

Primary Examiner—Robert R. Song
Attorney, Agent, or Firm—Patrick T. King

[57] ABSTRACT

A storable cover for covering the cabin portion of a variety of vehicles, such as sedans, vans, and hatchbacks, carries storage means secured thereto to be disposed in a suitable compartment of the vehicle. The trailing edge of the cover is anchored inside the vehicle when the cover is disposed onto the vehicle. The storage means is affixed firmly inside the trunk or other rear compartment of the various vehicles, such as for example, sedans, hatchbacks, and vans so as to locate part of the over assembly within a locked compartment. The cover is deployed by being taken out of the storage means and fed from the trunk through the opening which is created between the raised closure member for the compartment and the body of the vehicle.

17 Claims, 8 Drawing Sheets

CAR COVER AND ANCHORING ASSEMBLY

This is continuation-in-part of application Ser. No. 07/766,327, filed Sep. 26, 1991, now U.S. Pat. No. 5,188,417

BACKGROUND OF THE INVENTION

This invention pertains to an improved vehicle cover and more particularly to such a cover including storage means which also serve to anchor an end of the cover to the vehicle and which are useful with a variety of vehicles and in various locations within the vehicles.

It is known that sunlight damages the exposed surfaces of the interior of a vehicle. It is also known that when parked under direct sunlight, the vehicle's interior temperature rises due to the familiar greenhouse effect. This rise in temperature further damages the vehicle's interior. Furthermore, the hot air and the hot surfaces of the interior can prove uncomfortable for a person staying in or returning to the vehicle. Some articles in the vehicle such as magnetic media and electronic equipment can sometimes suffer from the elevated temperature as well.

In addition, when a vehicle is left to stand outside all night exposed to the elements, the finish on the vehicle will be dulled.

The general object of this invention is to provide sun protection for the interior of a vehicle by means of a highly effective, low cost, durable, easy to use, theft resistant and reflective sun protection cover to be deployed over the cabin of the vehicle.

The cover, its storage bag or pouch, and its attachment means for securing an end of the cover to an end of the vehicle are designed as a single integrated unit which significantly reduces the cost of the unit. It further makes the unit easier to use.

As shown herein the pouch is held firmly inside the trunk of the vehicle by plastic dipped hooks which engage openings in the trunk lid. The cover is deployed by being taken out of the trunk through the opening which is created between the trunk lid and the rear windshield or body of the vehicle when the trunk lid is opened. Accordingly, the deployment and storage of the cover can readily be handled by a single person requiring no special tools or the like. Since the cover is anchored or remains anchored securely at the trunk end thereof, it remains stable during deployment as well as during storage.

According to another feature of the invention, the cover uses the vehicle's own body parts to hold it in place when pulled over the cabin. At least one door of the vehicle is used to hold the cover in place by being closed onto it whereby the cover will fit underneath the upper portion of the door containing the window frame. The leading portion of the cover can be held in place by being tucked under the windshield wipers of the vehicle.

According to a further embodiment, the cover employs elastic strings disposed to be wrapped about the side view mirrors of the vehicle.

The foregoing design of the cover makes it substantially theft proof without requiring any specific tie-down or locks or alarms or the like. In the deployed position, the cover is firmly anchored to the interior of the trunk. With the trunk lid closed and locked it would be extremely difficult if not impossible to tamper or remove the cover from the vehicle. When the cover is stowed, the cover is safely locked within the trunk, concealed and out of sight.

SUMMARY OF THE INVENTION AND OBJECTS

In general as disclosed herein a storable vehicle cover for covering at least the cabin portion of a vehicle carries a storage means or pouch secured thereto to be disposed in the trunk of the vehicle in a manner anchoring the trailing edge of the cover when the cover is disposed onto the vehicle. The storage means or pouch remains affixed firmly inside the trunk of the vehicle. By opening the trunk lid of the vehicle the cover is in position to be readily removed from its associated pouch and fed from the trunk through the opening which is created between the raised trunk lid and the rear windshield or body of the vehicle.

In general it is an object of the present invention to provide an improved car cover for a variety of vehicles, including sedans, vans, and hatchbacks.

A protective vehicle cover according to the invention includes a sheet of strong, flexible, pliant material sufficient to overlay a substantial portion of the front windshield, rear windshield, and the side windows of a vehicle to be covered. The sheet carries a storage unit at one end thereof with the storage unit being anchored within a compartment of said vehicle. The compartment has a closure moveable between open and closed positions so that the sheet is clamped between the closure and the body of the vehicle when the closure is in its closed position.

The storage unit comprises a pair of panels joined together along a forward edge of each. One of the panels is movable between a first and a second position with respect to the other panel to form an open space therebetween for receiving the cover for storage therein.

The storage unit for the protective vehicle cover is mounted in a variety of vehicles and locations within the vehicles. For a sedan these locations include the floor of the trunk compartment of a vehicle and the rear sill of the trunk compartment of a vehicle. For a van, the location for the storage units include the rear closure door, where the protective sheet is disposed to be clamped between said rear closure door of the van and the body of said vehicle when said rear closure doors is in its closed position. For a hatchback, the storage unit is mounted in a rear storage compartment of a hatchback vehicle in locations such as the inside of the hatch door, the floor, the protective internal cover, and the rear sill.

A protective vehicle cover includes a sheet of strong, flexible, compliant material sufficient to overlay the front windshield, rear windshield and side windows of a vehicle to be covered. The sheet carries a storage pouch at one end thereof to be disposed within a compartment of the vehicle. The compartment has a closure member moveable between an open and a closed position. Means are provided for mounting the pouch from the interior surface of the compartment. The pouch has an opening thereto which is accessible for storing the sheet within the pouch.

The invention provides a method of protecting the interior and exterior of a vehicle of a type having a compartment accessible via a movable closure carried on a pair of laterally spaced hinges connected to the vehicle body. The method includes the steps of forming a sheet of material which is sufficient to overlay the front windshield, rear windshield and side windows of the vehicle, forming at one end of said sheet a storage pouch having top and bottom surface portions, yieldingly retaining said surface portions to be carried within the compartment of the vehicle, opening said compartment, removing said sheet from the pouch, feeding the sheet from the compartment onto the roof of the vehicle via an opening formed between the vehicle body and an edge of the closure between the hinges, clamping the sheet between the closure and the vehicle body to retain an end edge of said cover anchored inplace.

The method further includes the step of closing a side door in a manner to clamp a portion of the sheet covering the side window of the door between the vehicle body and the door to retain the sheet in a covering relation to the side window.

It is yet a further object of the invention to provide a car cover of the kind described having a reflective outer surface to minimize transmittal of heat into the vehicle.

It is yet an additional object of the invention to provide pie-shaped slits at the rear corners of the car cover associated with elastic strings bounding the space between the open end of the slits and extending further along the bottom edge of the cover whereby the cover assembly can accommodate a variety of sizes of vehicles.

Yet an additional object of the invention is the provision of a car cover having a relatively large open central region to permit wind to readily escape from beneath when it is being deployed.

Yet a further object of the invention is the provision of an improved method of deployment of a car cover onto a vehicle.

The foregoing and other objects of the invention shall become more readily evident from the following detailed description of preferred embodiments when considered in conjunction with the drawings.

DETAILED DESCRIPTION OF THE PREFERRED EMBODIMENTS

Preferably the nature of the material employed in the car cover 10 should be chosen to be wear and tear resistant, weather resistant, lightweight, thin, foldable, stain resistant, washable, non-shrinking and able to hold print. One such material which provides the foregoing qualifications includes nylon.

Figure 1:
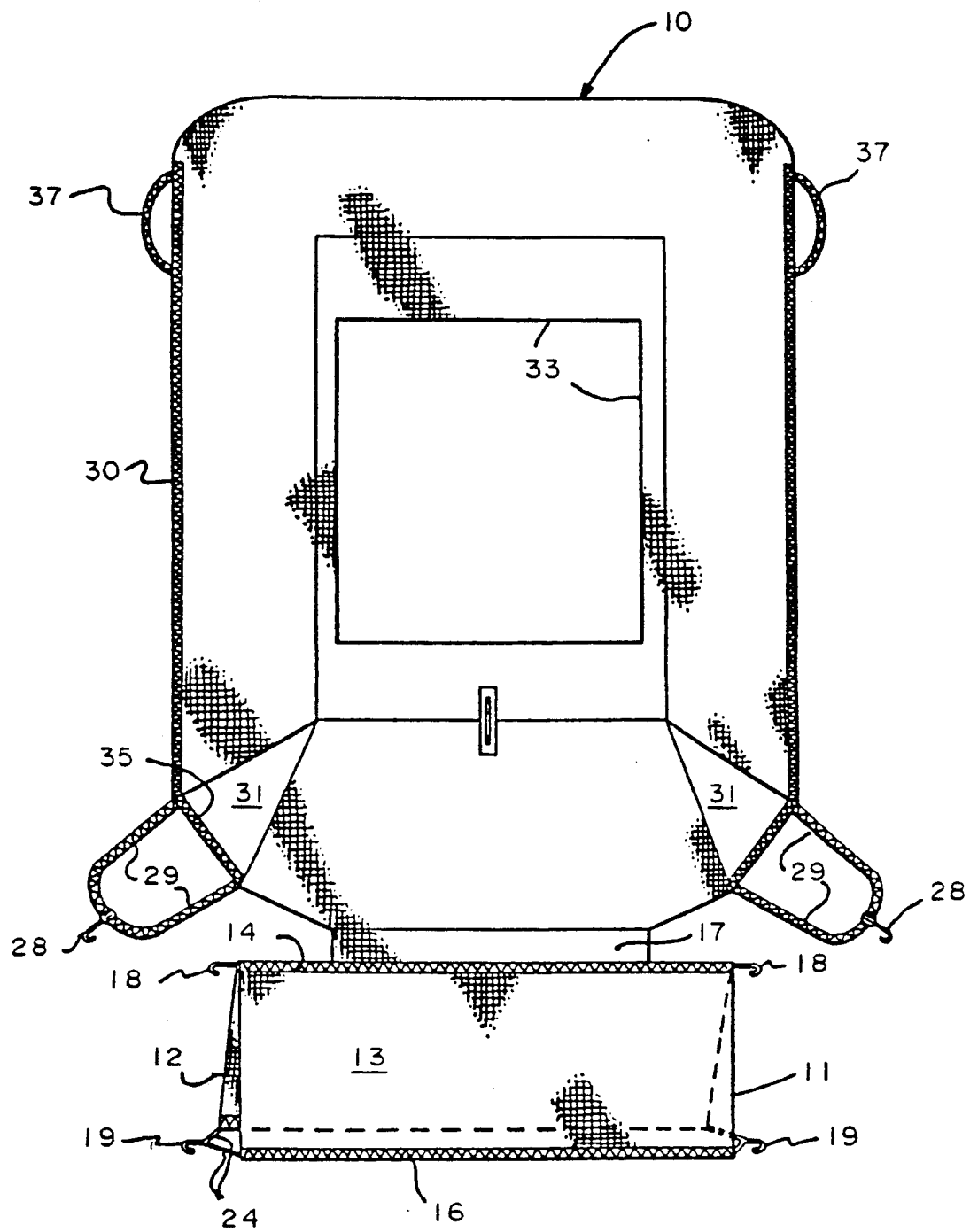
FIG. 1 shows a plan view of a car cover according to the invention.
Figure 2:
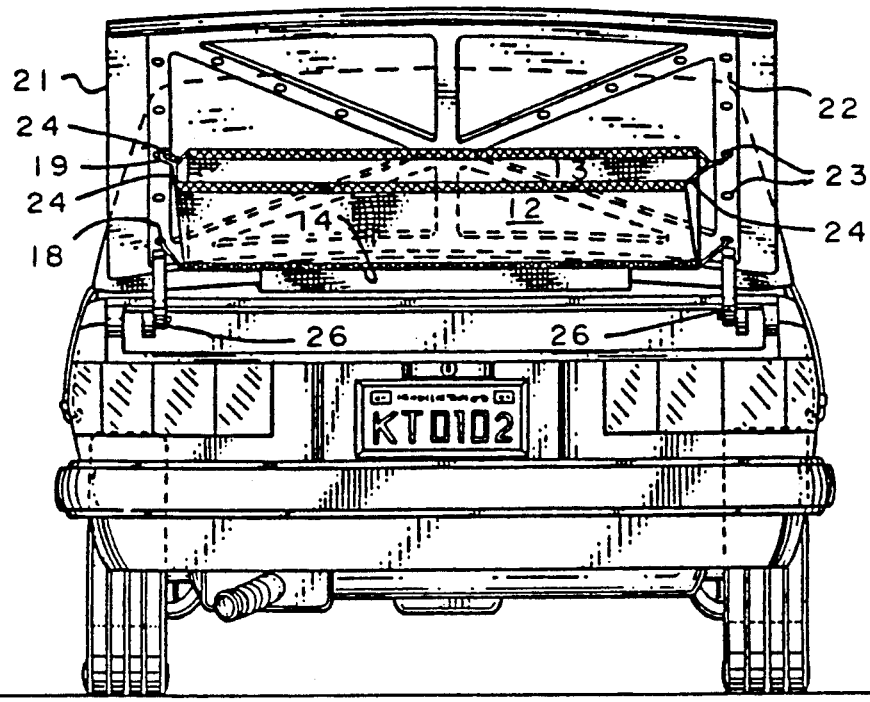
FIG. 2 shows the rear of a vehicle with its trunk raised and a storage pouch portion of the car cover disposed in place.

Of the foregoing characteristics the sheet of material forming cover 10 should primarily be strong, flexible, and pliant. Cover 10 carries a storage unit or pouch 11 at the trailing end thereof as shown in FIG. 1. Storage unit 11 comprises a pair of fabric panels 12, 13. Panels 12, 13 are mutually joined together along a forward edge of each panel. One of panels 12, 13 is movable between raised and lowered positions with respect to the other said panel to form an open space therebetween for receiving the car cover 10 to be stored therein. Preferable, the trailing edge of both panels 12, 13 carries a flexible reinforcing material 16 sewn into the edge margin thereof so as to both reinforce the edge margin of panels 12, 13 and to permit the edge margin to flex when removing cover 10 therefrom.

Cover 10 includes a tail piece 17 of essentially flat material captured between the leading edge margins of panels 12, 13 of storage unit 11. Thus the leading edge margins 14 of panels 12, 13 are sewn together therealong and capture tail piece 17 therebetween.

Cover 10 has a sufficient scope so as to cover the trailing windshield, the leading windshield, and side windows of the vehicle to which it is to be employed.

Finally, storage unit 11 includes a plurality of plastic dipped hooks 18, 19 to be connected to the underside of trunk lid 21.

Thus, trunk lid 21 has been provided with the usual strengthening or reinforcing bars 22. Bars 22 as shown have been formed with a number of openings 23 therein which can be engaged by the ends of hooks 18, 19. As thus arranged, a storage pouch for use in a vehicle has been provided comprising confronting flexible side panels 12, 13 wherein the side panels are joined along a given edge 14 while an opening is formed along the opposite edge of pouch 11. A plurality of hooks 18, 19 coupled to pouch 11 serve to support same from the underside of the interior of a compartment of the vehicle. Hooks 19 each support the trailing edge of a pair of edges 16 of pouch 11 by means of an elastic band 24. Thus band 24 serves to pull the trailing corners of panels 12, 13 together while hook 19 supports both of the trailing edges.

A pair of spaced apart hinges 26 serves to support trunk lid 21 for movement between lowered and raised positions.

Figure 3:
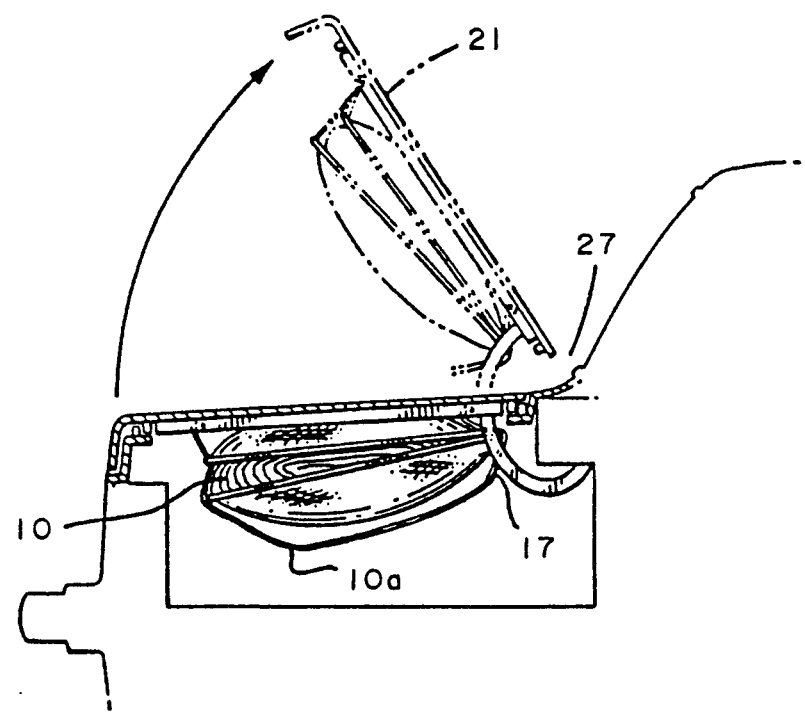
FIG. 3 shows a side elevation of a vehicle trunk containing a car cover stored therein.
Figure 4:
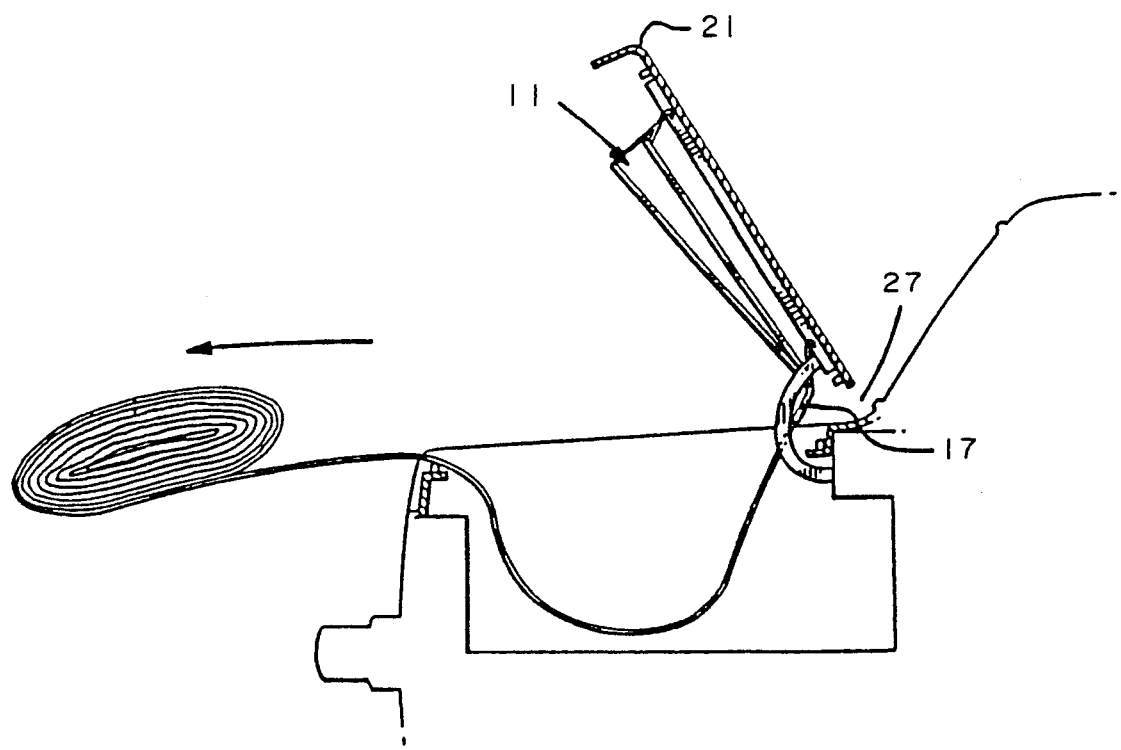
FIG. 4 shows a side elevation showing the removal of the car cover from the pouch carried by the closure of the trunk.
Figure 5:
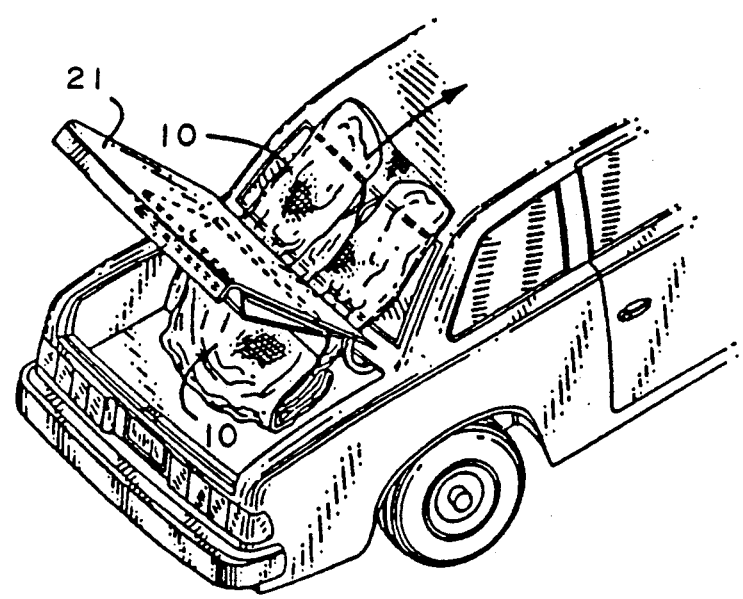
FIG. 5 shows a perspective view showing how the car cover can be fed through the opening between the trunk lid and the body of the vehicle.
Figure 6:
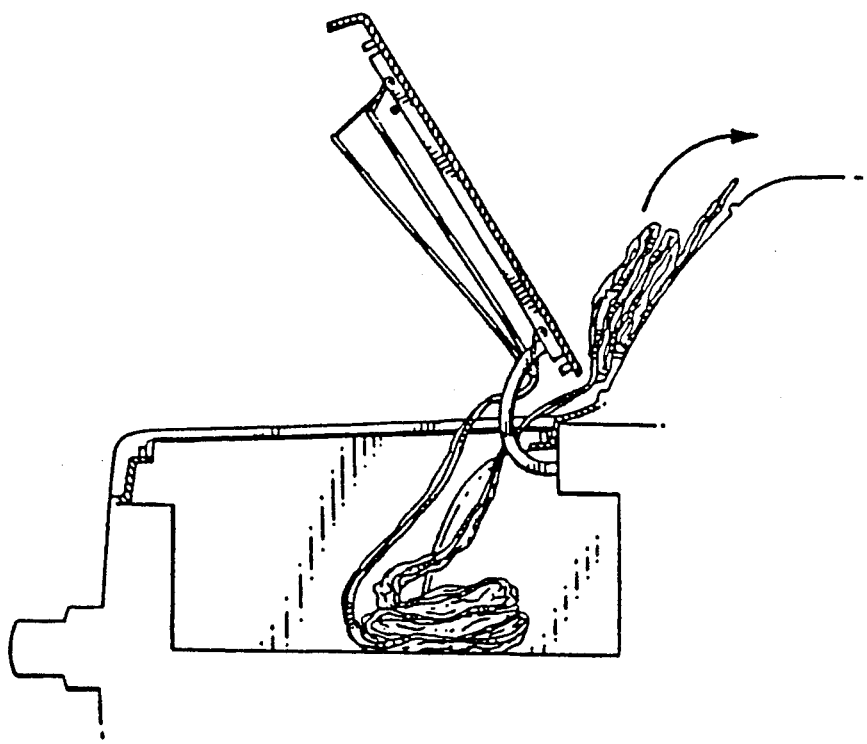
FIG. 6 shows a side elevation view of the construction shown in FIG. 5 illustrating the feeding of the car cover through the opening formed between the trunk lid and the vehicle body.

As shown in FIGS. 3 and 4 with trunk lid 21 in its raised position an opening 27 is defined between the leading edge of trunk lid 21 and the body of the vehicle.

As shown FIG. 3, the tail piece 17 joins the balance of the cover 10 to pouch 11. Accordingly a very small length 10a of cover 10 will underlie pouch 11 when the cover has been stored therein. When it is desired to employ cover 10 to protect the interior and exterior of a vehicle of a type having a compartment such as the trunk accessible via a moveable closure carried one pair of laterally spaced hinges connected to the vehicle body, the method of installing the cover comprises the steps of forming a sheet of reflective material such as cover 10 which is sufficient to overlay the front windshield, rear windshield and side windows of the vehicle. The next step is to form at one end of the sheet a storage pouch having a top and bottom surface portions. Next the surface portions are yieldingly retained to be carried within the compartment of the vehicle from the underside of the closure thereof. The next step is to open the compartment, then remove the sheet of material forming cover 10 from the pouch 11. Next the sheet of material forming cover 10 is fed from the trunk compartment onto the roof of the vehicle via opening 27 formed between the vehicle body and an edge of the closure 21 and defined between hinges 26. The next step is to clamp the sheet of material forming cover 10 between closure 21 and the vehicle body to retain an end of the wheel opening for a vehicle. (See FIG. 7.)

As mentioned above, in order to avoid capturing the substantial gust of air beneath cover 10 as it is being applied to the vehicle and thereby make it difficult to handle, a relatively large opening 33 has been formed in the top of cover 10.

Figure 8:
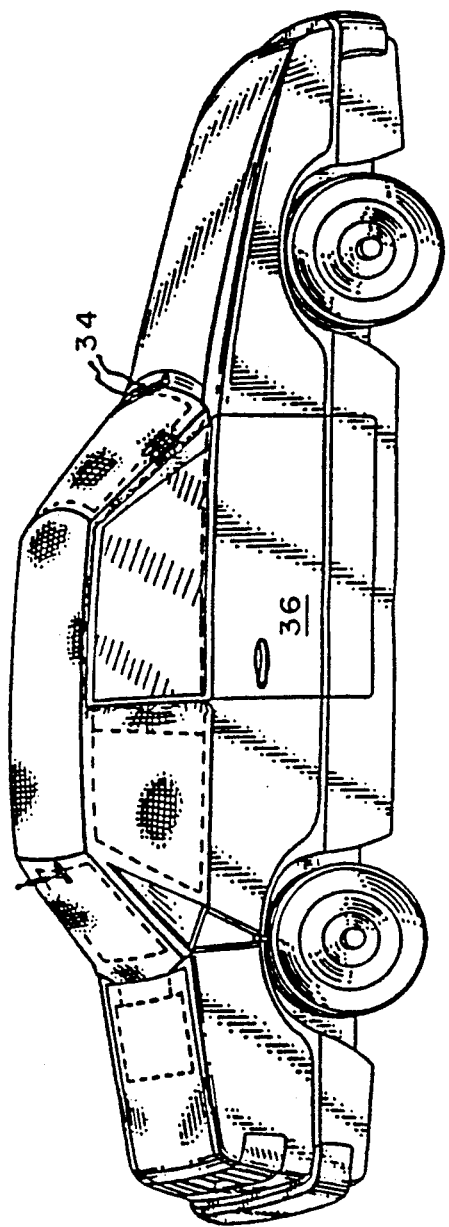
FIG. 8 shows a car cover disposed in place on a vehicle according to the first embodiment.

Means for anchoring the forward end of cover 10 to cover with the leading windshield of the vehicle includes the step of simply tucking the leading end edge margin of cover 10 beneath the windshield wiper blades 34 as shown in FIG. 8.

The embodiment shown in FIG. 8 also shows the concept of closing and locking the side doors 36 of the vehicle out to the downwardly depending portion of cover 10 so as to cover the door windows from the inside.

Figure 7:
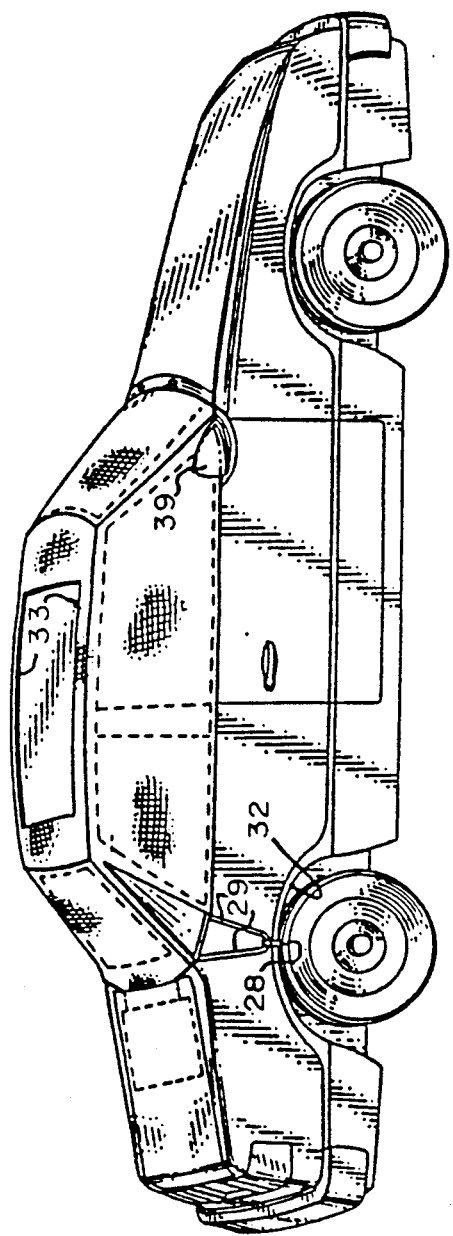
FIG. 7 shows a vehicle covered and protected by a car cover of the kind described according to another embodiment of the invention.

According to another embodiment as shown in FIG. 7, the leading end of cover 10 can be secured by means of elastic straps 37 disposed to be hooked about the outside mirrors on opposite sides of the vehicle such as mirror 39.

Thus cover 10 can be clamped by the side doors of the vehicle and locked, whereby the sides serve to cover the side windows while the vehicle remains locked.

From the foregoing it will be readily evident that there has been provided an improved car cover capable of being locked securely to the vehicle and in which the car cover carries its own storage pouch within a compartment of the vehicle.

In addition to the above, it will be evident that the number of appropriate openings such as for antenna and the like can be located variously through the cover.

The side edges of cover 10 further include elastic drawstring bands 30, 35 serving to accommodate variations in the size of the cabin portion of various vehicles.

In addition, it will be evident that pouch 11 can also be provided by employing a single panel 12 located closely in confronting relation to the underside of trunk lid 21.

Figure 9:
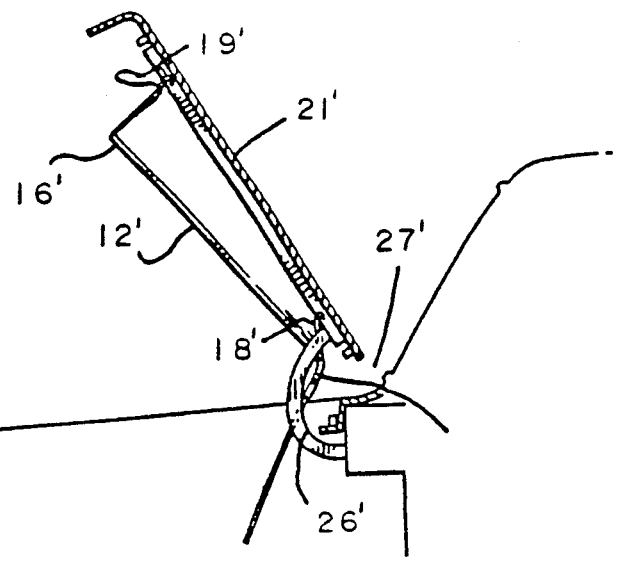
FIG. 9 shows an enlarged detail in side elevation of another embodiment of the invention.

Thus, as shown in FIG. 9, a single panel 12' hung from hooks 18', 19' disposes panel 12' in confronting relation with respect to the underside of trunk lid 21'. The trailing edge margin 16' can flex away from trunk lid 21' to accommodate the storage of a car cover therebetween.

FIGS. 10-17 illustrate a number of examples of a car cover being used with a variety of vehicles and locations within each type of vehicle. For example, the vehicles include sedan-type vehicles as described herein above, vans, and hatchbacks. The pouch for containing the cover can be mounted in a variety of places within a vehicle. For example, in a sedan, the pouch can be mounted to the inside surface of the truck lid or to various other places within the trunk on the trunk deck and rear sill. Similarly, the pouch can be mounted in various places within a hatchback or a van vehicle, as described herein below. Mounting of the pouch to the various locations is accomplished, for example, using a plurality of straps and hooks as discussed previously. Deployment and storage of the car cover is similar to that described herein above.

Figure 10:
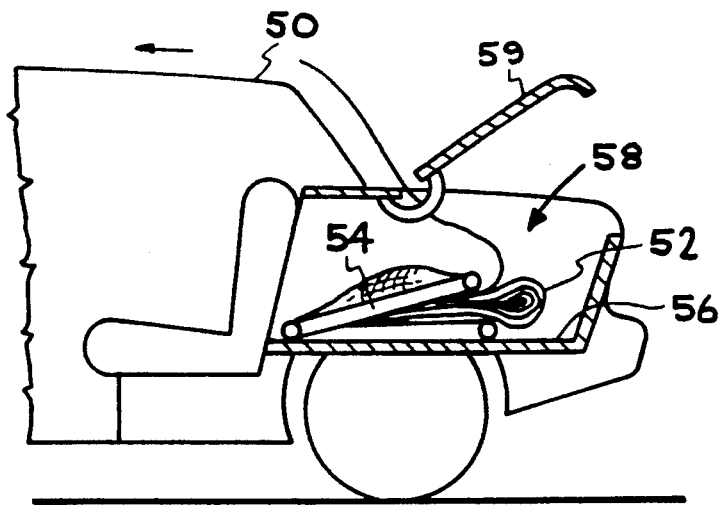
FIG. 10 shows a side sectional elevation view of a sedan with a car cover stored in a pouch on the rear sill of the trunk compartment.

FIG. 10 shows a sedan 50 with a car cover 52 stored in a pouch 54 located on the deck 56 of the trunk compartment 58. The car cover is threaded between the rear edge of the truck lid 60 and the body of the vehicle.

Figure 11:
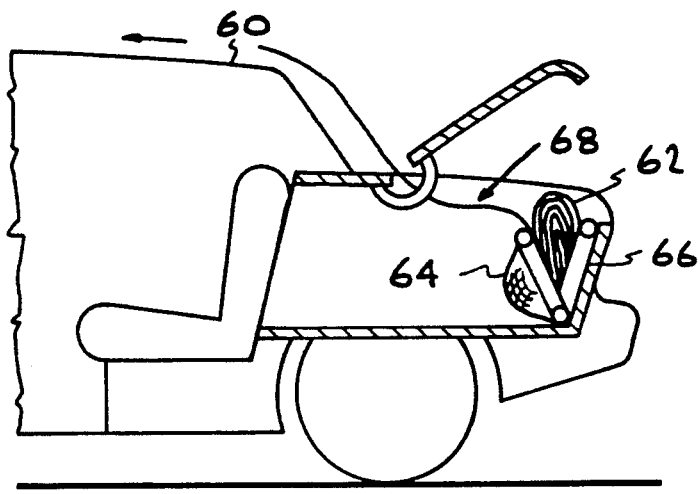
FIG. 11 shows a side sectional elevation view of a sedan with a car cover stored in a pouch on the rear sill of the trunk compartment

FIG. 11 shows a sedan 60 with a car cover 62 stored in a pouch 64 located on the rear sill 66 of the trunk compartment 68.

Figure 12:
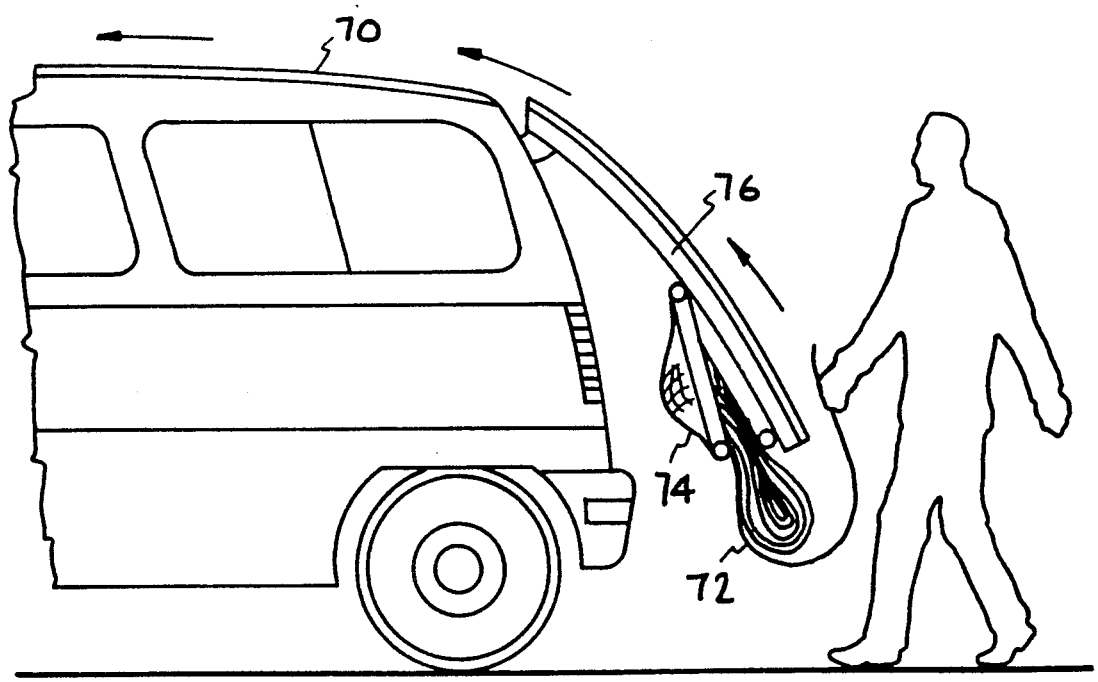
FIG. 12 shows a side elevation view of a van with a car cover stored in a pouch located on the inside surface of the rear hatch door and threaded through the opening between the bottom of the hatch door and the body of the van.

FIG. 12 show a van-type of vehicle 70 with a car cover 72 stored in a pouch 74 located on the inside surface of the rear hatch door 76 and threaded through the opening between the bottom of the hatch door 76 and the lower body of the van 70. The sheet of material forming the cover 72 is fed from the pouch in the van compartment onto the roof of the vehicle in several ways. As illustrated one way is to feed the cover through the opening formed between the vehicle body and the bottom of the rear hatch door closure with the cover being held between the rear hatch door and the lower body of the van 70.

Figure 13:
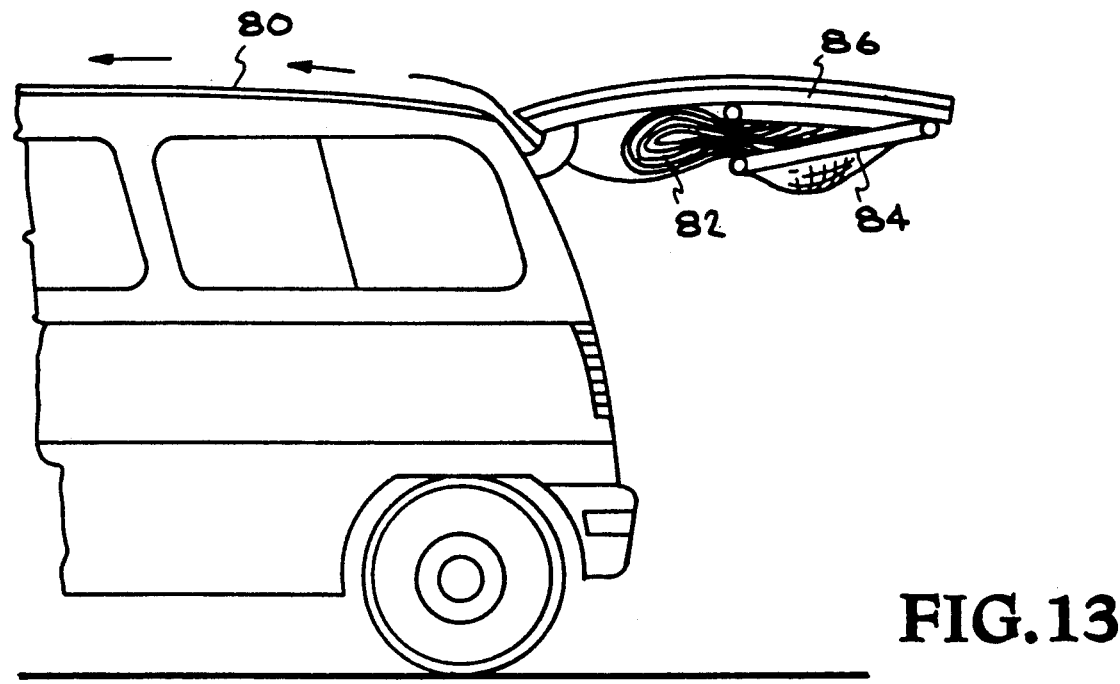
FIG. 13 shows a side elevation of a van with a car cover stored in a pouch located on the inside surface of the rear hatch door and threaded through the opening between the top of the hatch door and the rear edge of the roof of the van.

FIG. 13 shows a van 80 with a car cover 82 stored in a pouch 84 located on the inside surface of the rear hatch door 86 and threaded through the opening between the top of the hatch door 86 and the rear edge of the roof of the van 82.

Figure 14:
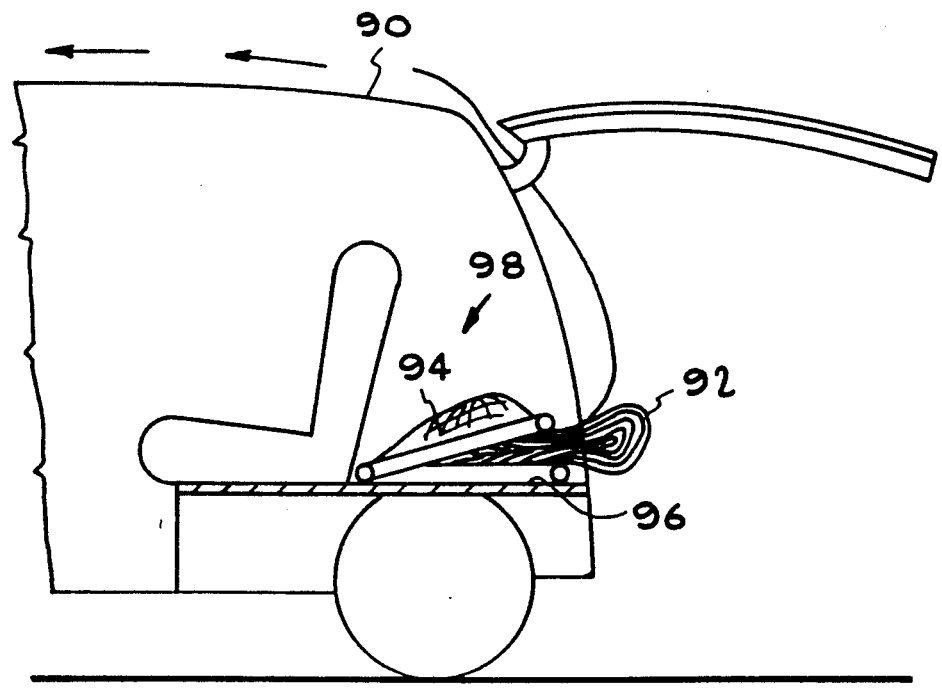
FIG. 14 shows a side sectional elevation view of a van or hatchback vehicle with a car cover stored in a pound located on the floor surface of the rear cargo area thereof.

FIG. 14 shows a van or hatchback-type vehicle 90 with a car cover 92 stored in a pouch 94 located on the floor or rear deck surface 96 of the rear cargo area 98 of the vehicle.

Figure 15:
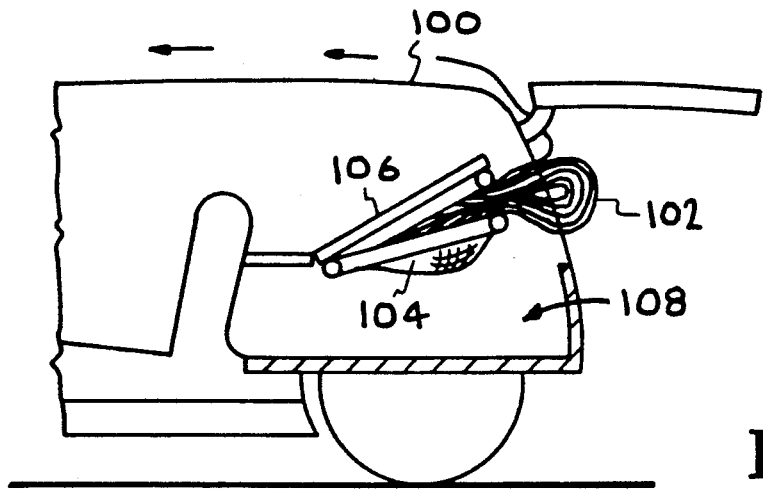
FIG. 15 shows a side sectional elevation view of a hatchback vehicle with a car cover stored in a pouch located on the inside surface of a privacy screen for the rear cargo area thereof.

FIG. 15 shows a hatchback-type vehicle 100 with a car cover 102 stored in a pouch 104 located on the inside surface of a privacy screen 106 for covering the rear cargo area 108 of the hatchback.

Figure 16:
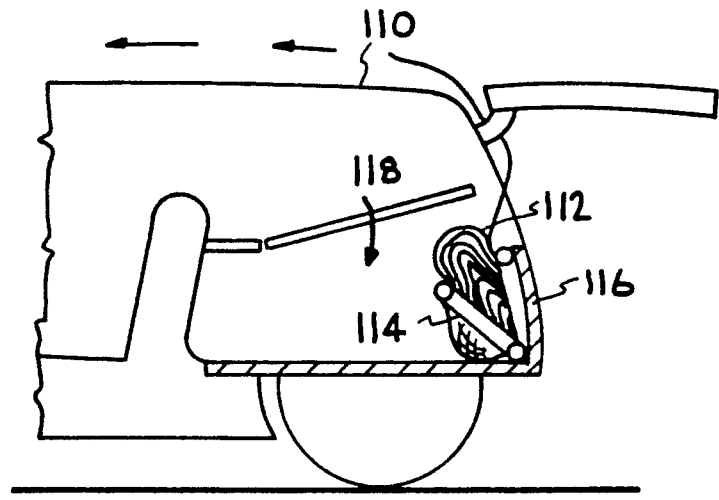
FIG. 16 shows a side sectional elevation view of a hatchback vehicle with a car cover stored in a pouch located on the outside rear sill of the rear cargo area thereof.

FIG. 16 shows a hatchback vehicle 110 with a car cover 112 stored in a pouch 114 located on inside surface of the rear sill 116 of the rear cargo area 118 of the hatchback.

Figure 17:
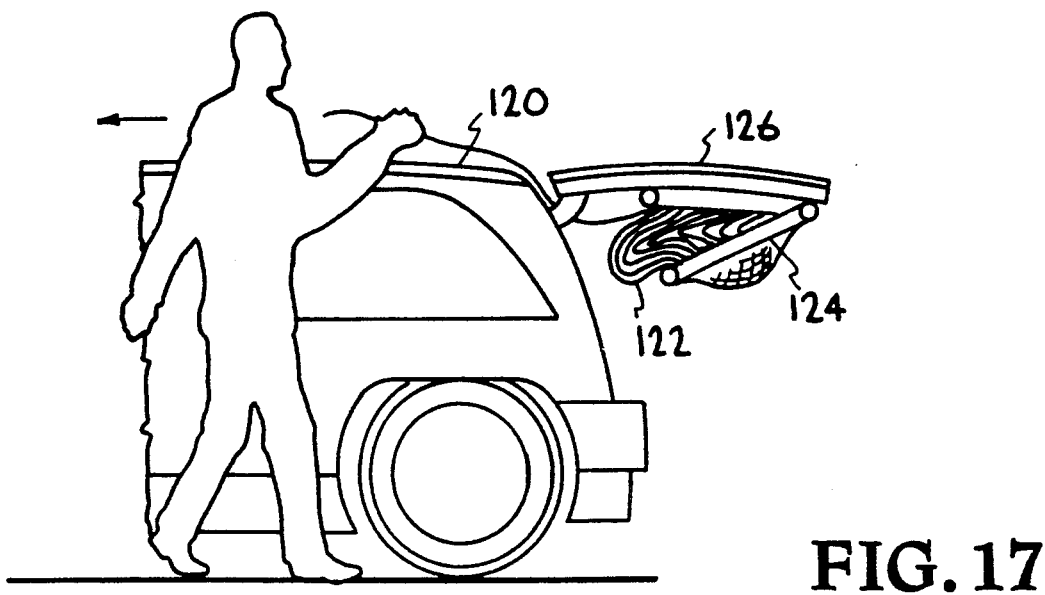
FIG. 17 shows a side sectional elevation view of a hatchback vehicle with a car cover stored in a pouch located on the inside surface of the rear hatch door.

FIG. 17 shows a hatchback vehicle 120 with a car cover 122 stored in a pouch 124 located on the inside surface of the rear hatch door 126 of the vehicle. The cover 122 is deployed through the space between the top of the door 126 and the rear edge of the roof of the vehicle, as illustrated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A protective vehicle cover comprising a sheet of strong, flexible, pliant material sufficient to overlay a substantial portion of the front windshield, rear windshield, and the side windows of a vehicle to be covered, said sheet carrying a storage unit at one end thereof, said storage unit being anchored within a compartment of said vehicle, said compartment having a closure moveable between open and closed positions, said sheet being disposed to be clamped between said closure and the body of said vehicle when said closure is in its closed position;

wherein said storage unit comprises a pair of panels joined together along a forward edge of each, one of said panels being movable between a first and a second position with respect to the other said panel to form an open space therebetween for receiving said cover to be stored therein.

2. The protective vehicle cover of claim 1 wherein said storage unit is mounted to the floor of the trunk compartment of a vehicle.

3. The protective vehicle cover of claim 1 wherein said storage unit is mounted to the rear sill of the trunk compartment of a vehicle.

4. The protective vehicle cover of claim 1 wherein said storage unit is mounted to a rear closure door of a van vehicle.

5. The protective vehicle cover of claim 4 wherein said sheet is disposed to be clamped between said rear closure door of the van and the body of said vehicle when said rear closure doors is in its closed position.

6. The protective vehicle cover of claim 5 wherein said sheet is disposed to be clamped between the top of said rear closure door of the van and the body of said vehicle when said rear closure doors is in its closed position.

7. The protective vehicle cover of claim 5 wherein said sheet is disposed to be clamped between the bottom of said rear closure door of the van and the body of said vehicle when said rear closure doors is in its closed position.

8. The protective vehicle cover of claim 1 wherein said storage unit is mounted in a rear storage compartment of a hatchback vehicle.

9. The protective vehicle cover of claim 8 wherein said hatchback vehicle has a rear storage compartment and wherein said storage unit is mounted to the inside of the hatch door of the rear storage compartment of said hatchback vehicle.

10. The protective vehicle cover of claim 8 wherein said hatchback vehicle has a rear storage compartment and wherein said storage unit is mounted to the floor of said hatchback vehicle.

11. The protective vehicle cover of claim 8 wherein said hatchback vehicle has a rear storage compartment with a protective internal cover and wherein said storage unit is mounted to protective internal cover of said hatchback vehicle.

12. The protective vehicle cover of claim 8 wherein said storage unit is mounted to a rear sill of said hatchback vehicle.

13. The protective vehicle cover of claim 1 in which said cover is characterized by reflective exterior surface when installed on said vehicle so as to reflect heat away from said vehicle.

14. The protective vehicle cover according to claim 1 in which said cover is characterized by a slick, non-sticky undersurface when installed on said vehicle.

15. A protective vehicle cover comprising a sheet of strong, flexible, compliant material sufficient to overlay the front windshield, rear windshield and side windows of a vehicle to be covered, said sheet carrying a storage pouch at one end thereof to be disposed within a compartment of the vehicle, said pouch having top and bottom surface portions, the compartment having a closure member moveable between open and closed positions, means for securing an end of one of said surface portions to an interior surface of said compartment, said pouch having an opening thereto which is accessible for storing said sheet within said pouch with said closure member in said open and closed positions.

16. A method of protecting the interior and exterior of a vehicle of a type having a compartment accessible via a movable closure carried on a pair of laterally spaced hinges connected to the vehicle body, said method comprising the steps of forming a sheet of material which is sufficient to overlay the front windshield, rear windshield and side windows of the vehicle, forming at one end of said sheet a storage pouch having top and bottom surface portions, securing an end of one of said surface portions to an interior wall of the compartment, removably retaining said sheet of material in said pouch within the compartment of the vehicle, opening said compartment, removing said sheet from the pouch, feeding the sheet from the compartment onto the roof of the vehicle via an opening formed between the vehicle body and an edge of the closure between the hinges, clamping the sheet between the closure and the vehicle body to retain an end edge of said cover anchored in place.

17. The method according to claim 16 wherein the vehicle includes side doors, the method further including the step of closing a side door in a manner clamping that portion of said sheet covering the side window of the door between said vehicle body and the door to retain the sheet in a covering relation to the side window.

* * * * *